(12) United States Patent
Noordhuis

(10) Patent No.: US 11,992,149 B2
(45) Date of Patent: May 28, 2024

(54) BEVERAGE MAKING DEVICE COMPRISING A SWITCHING VALVE

(71) Applicant: KONINKLIJKE PHILIPS N.V., Eindhoven (NL)

(72) Inventor: Joeke Noordhuis, Groningen (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 407 days.

(21) Appl. No.: 16/615,912

(22) PCT Filed: Jun. 28, 2018

(86) PCT No.: PCT/EP2018/067360
§ 371 (c)(1),
(2) Date: Nov. 22, 2019

(87) PCT Pub. No.: WO2019/002438
PCT Pub. Date: Jan. 3, 2019

(65) Prior Publication Data
US 2020/0138235 A1 May 7, 2020

(30) Foreign Application Priority Data
Jun. 28, 2017 (EP) .................................. 17178297

(51) Int. Cl.
*A47J 31/46* (2006.01)
*A47J 31/44* (2006.01)
(52) U.S. Cl.
CPC ......... *A47J 31/461* (2018.08); *A47J 31/4485* (2013.01); *A47J 31/468* (2018.08); *A47J 31/469* (2018.08)
(58) Field of Classification Search
None
See application file for complete search history.

(56) References Cited

U.S. PATENT DOCUMENTS 4,189,991 A 2/1980 Haddad
6,405,637 B1 6/2002 Cai
(Continued)

FOREIGN PATENT DOCUMENTS

CN 101496694 5/2011
CN 102626290 A * 8/2012 ............ A47J 31/461
(Continued)

OTHER PUBLICATIONS

Machine translation of CN 102626290 A performed on Feb. 24, 2022, Chai (Year: 2012).*
(Continued)

*Primary Examiner* — Dana Ross
*Assistant Examiner* — Kevin Guanhua Wen
(74) *Attorney, Agent, or Firm* — Maschoff Brennan

(57) ABSTRACT

The invention provides a beverage maker comprising a pressure-controlled switching valve (1) that comprises the following components: a valve body (20) comprising an internal switching space (21); a switching device (40) being movably arranged in the internal switching space (21) and comprising two functional valve members (41, 42) that are arranged and configured to seal respective fluid outlet openings (23, 24) of the valve body (20) in respective positions of the switching device (40); a position setting device (30) for displacing the switching device (40) under the influence of fluid pressure acting on the position setting device (30) at one side thereof; and a biasing mechanism (70) acting on the entirety of the switching device (40) and the position setting device (30) coupled thereto. One side of at least a functional portion (31) of the position setting device (30) is open to a conduit system of the beverage maker.

17 Claims, 4 Drawing Sheets

(56) References Cited

U.S. PATENT DOCUMENTS

| | | | |
|---|---|---|---|
| 7,219,597 B2 | 5/2007 | Eicher | |
| 8,267,666 B2 * | 9/2012 | Gruber et al. | F04B 49/00 417/26 |
| 9,038,529 B2 | 5/2015 | Riessbeck | |
| 2013/0298776 A1 * | 11/2013 | Mulder et al. | A47J 31/46 |

FOREIGN PATENT DOCUMENTS

| | | | | |
|---|---|---|---|---|
| CN | 104105433 A | | 10/2014 | |
| CN | 1204049309 U | | 12/2014 | |
| DE | 20218339 | | 2/2003 | |
| DE | 202008003303 U1 * | | 9/2009 | A47J 31/46 |
| EP | 2243406 A1 * | | 10/2010 | A47J 31/44 |
| WO | 2006/033049 | | 3/2006 | |
| WO | WO 2006033049 A1 * | | 3/2006 | A23F 5/262 |
| WO | 2010/121299 | | 10/2010 | |
| WO | WO 2012137185 A1 * | | 10/2012 | A47J 31/36 |
| WO | 2016/125085 | | 8/2016 | |
| WO | WO 2017001012 A1 * | | 1/2017 | A47J 31/44 |
| WO | WO 2017097674 A1 * | | 6/2017 | A47J 31/44 |

OTHER PUBLICATIONS

Machine translation of DE 202008003303 U1 performed on Feb. 24, 2023, Haverkamp (Year: 2009).*

International Search Report and Written Opinion dated Sep. 12, 2018 for International Application No. PCT/EP2018/067360 Filed Jun. 28, 2018.

* cited by examiner

US 11,992,149 B2

BEVERAGE MAKING DEVICE COMPRISING A SWITCHING VALVE

CROSS REFERENCE TO RELATED APPLICATIONS

This application is the U.S. National Phase application under 35 U.S.C. § 371 of International Application No. PCT/EP2018/067360 filed Jun. 28, 2018, published as WO 2019/002438 on Jan. 3, 2019, which claims the benefit of European Patent Application Number 17178297.2 filed Jun. 28, 2017. These applications are hereby incorporated by reference herein.

FIELD OF THE INVENTION

The invention relates to a beverage making device that is designed to make a hot beverage by allowing for interaction between a beverage basic material and a hot extracting liquid in one operation mode thereof, and to froth a liquid by supplying a frothing gas to a liquid in another operational mode thereof, comprising: a first functional unit that is arranged and configured to accommodate a quantity of the beverage basic material and to receive a quantity of hot extracting liquid; a second functional unit that is arranged and configured to accommodate a quantity of liquid to be frothed and to receive a quantity of frothing gas; a heating unit that is arranged and configured to heat a quantity of input liquid for the purpose of obtaining a quantity of hot extracting liquid or a quantity of hot frothing gas; a pumping unit that is arranged and configured to pump the input liquid to the heating unit, and that is operable to realize one of at least two different flow rates of the input liquid; a switching valve that is arranged downstream of the heating unit, and that is coupled to the heating unit, the first functional unit, and the second functional unit; and a conduit system that is arranged and configured to enable fluid transport through the beverage making device, and that comprises a pumping conduit connecting the pumping unit to the heating unit, a valve conduit connecting the heating unit to the fluid inlet opening of the valve body of the switching valve, and furthermore a first conduit connecting the first fluid outlet opening of the valve body of the switching valve to the first functional unit, and a second conduit connecting the second fluid outlet opening of the valve body of the switching valve to the second functional unit, respectively.

BACKGROUND OF THE INVENTION

A beverage making device that is designed to perform the functionalities of making a hot beverage and frothing a liquid is known in the art. A well-known example of a hot beverage is coffee and a well-known example of a liquid to be frothed is milk. Furthermore, a well-known example of a beverage basic material is ground coffee, a well-known example of a hot extracting liquid is hot water, and a well-known example of a frothing gas is steam. These examples are implicit in the following description of the prior art and the invention, wherein it is noted that it should be understood that the invention is not limited to these examples in any way.

According to one known option, a beverage making device incorporating two functionalities of making coffee and frothing milk is equipped with two separate heating units, one heating unit being adapted to heat water to a temperature at which it is suitable to be used for brewing coffee, and another heating unit being adapted to heat water to a higher temperature such that the water evaporates and steam is generated. According to another known option, costs may be saved by having a single heating unit that can be used in at least two different operational modes. In such a case, an electrically controlled switching valve is used to direct an output fluid of the heating unit, i.e. hot water or steam, to the right direction in the beverage making device, i.e. to a coffee brewing unit or to a milk frothing unit. The present invention is in the context of the latter option, and aims to provide an alternative of the electrically controlled valve in order to reduce costs even further.

WO 2010/121299 A1 discloses an example of a beverage making device comprising a two different functional units, namely a coffee brewing unit and a milk frothing unit, and further comprising a single heating unit, and an electrically controlled switching valve as mentioned. WO 2006/033049 A1 relates to a pressure release valve used in a beverage making device, the valve comprising a housing that is divided in two parts by a membrane, and the membrane comprising a central rigid portion and a central protrusion by means of which an inlet and an outlet, respectively, of the valve can be closed.

SUMMARY OF THE INVENTION

It is an object of the invention to provide a beverage making device having at least two different functionalities as explained in the foregoing and comprising a switching valve, i.e. a valve that is capable of receiving fluid and performing a switching functionality so as to output the fluid towards one of at least two different destinations. The switching valve of the beverage making device according to the invention should constitute a cheap yet practical and reliable alternative to existing switching valves that are hitherto used in the context of beverage making.

In view of the foregoing, the invention provides a beverage making device that is designed to make a hot beverage by allowing for interaction between a beverage basic material and a hot extracting liquid in one operational mode thereof, and to froth a liquid by supplying a frothing gas to a liquid in another operational mode thereof, comprising: a first functional unit that is arranged and configured to accommodate a quantity of the beverage basic material and to receive a quantity of hot extracting liquid; a second functional unit that is arranged and configured to accommodate a quantity of liquid to be frothed and to receive a quantity of frothing gas; a heating unit that is arranged and configured to heat a quantity of input liquid for the purpose of obtaining a quantity of hot extracting liquid or a quantity of hot frothing gas; a pumping unit that is arranged and configured to pump the input liquid to the heating unit, and that is operable to realize one of at least two different flow rates of the input liquid; a pressure-controlled switching valve that is arranged downstream of the heating unit, that is coupled to the heating unit, the first functional unit, and the second functional unit, and that comprises a valve body, a switching device, a position switching device and a biasing mechanism, the valve body comprising an internal switching space that is accessible from outside the valve body through at least one fluid inlet opening in the valve body, and that is associated with two fluid outlet openings in the valve body, the switching device being movably arranged in the internal switching space and comprising a first functional valve member that is arranged and configured to seal a first fluid outlet opening in a first position of the switching device, and a second functional valve member that is arranged and configured to seal a second fluid outlet opening in a second position of the switching device, the position setting device being arranged in the valve body and being coupled to the switching device, at least a functional portion of the position setting device being arranged and configured to be displaceable from a default position under the influence of fluid pressure acting on the position setting device at one side thereof, and the biasing mechanism being arranged and configured to bias the entirety of the switching device and the position setting device coupled thereto towards a position corresponding to the default position of the functional portion of the position setting device; and a conduit system that is arranged and configured to enable fluid transport through the beverage making device, and that comprises a pumping conduit connecting the pumping unit to the heating unit, a valve conduit connecting the heating unit to the fluid inlet opening of the valve body of the switching valve, and furthermore a first conduit connecting the first fluid outlet opening of the valve body of the switching valve to the first functional unit, and a second conduit connecting the second fluid outlet opening of the valve body of the switching valve to the second functional unit, respectively, wherein one side of at least a functional portion of the position setting device of the switching valve is open to the conduit system.

It follows from the foregoing definition of the beverage making device according to the invention that it comprises a switching valve of the pressure-controlled type. This means that no electronics are needed to realize the switching functionality as desired in the beverage making device. Instead, all that is needed to have the switching functionality is allowing for communication between the switching valve and an area where a relevant pressure, i.e. a pressure that is indicative of an actual operational mode of the beverage making device, is prevailing. In particular, according to the invention, this can be done by putting the switching valve in an arrangement in which one side of at least a functional portion of the position setting device is in communication with a flow of fluid. As realizing a flow of fluid requires having a pressure difference, allowing the fluid from a flow of fluid to act on the position setting device of the switching valve results in the exertion of a pressure on the functional portion of the position setting device. As long as the pressure is relatively low and the biasing mechanism is capable of counteracting the pressure, the functional portion of the position setting device will remain in the default position. When the pressure is higher, another equilibrium is set, which involves a displaced position of the functional portion of the position setting device. The fact that the functional portion of the position setting device can be in one of at least two positions, namely a default position and at least one displaced position, can be used to dictate a position of the switching device, particularly to have the switching device in one of a position in which the first fluid outlet opening of the valve body is sealed and the second fluid outlet opening is open, and a position in which the second fluid outlet opening of the valve body is sealed and the first fluid outlet opening is open.

The design of the switching valve of the beverage making device according to the invention can be easily adapted to specific requirements of a certain application. In particular, the point at which a transition of one switching position of the valve to another switching position is obtained can be set by tuning the biasing mechanism. In any case, the invention provides a beverage making device comprising a passive switching valve that is controlled automatically on the basis of pressure as an input value, which pressure is available as the switching functionality is applied in a situation in which a flow of fluid is present, wherein there is no need for electrical control of the valve. An appropriate arrangement of the valve in the beverage making device is an arrangement in which one side of at least a functional portion of the position setting device of the valve is open to a conduit extending between a pumping unit and a heating unit of the device, for example.

A notable characteristic of the pumping unit of the beverage making device according to the invention is that the pumping unit is arranged and configured to realize one of at least two different flow rates of the input fluid. On the basis of this fact, the switching valve is enabled to switch under the influence of fluid pressure differences. As one side of at least a functional portion of the position setting device of the switching valve is open to the conduit system, preferably to the pumping conduit, a situation in which the functional portion of the position setting device is under the direct influence of pressurized fluid is realized. In the example of the first functional unit being a coffee brewing unit and the second functional unit being a milk frothing unit, it is a fact that the fluid flow rate is lower in the milk frothing mode of the device so as to be able to make steam in the same heating unit in which water is heated for the purpose of making coffee in the other operational mode of the device. Hence, the pressure drop associated with milk frothing is lower than the pressure drop associated with coffee brewing. In order to enhance this effect, i.e. in order to make a clear differentiation, it may be advantageous to have a flow restrictor that is arranged and configured to locally decrease an internal diameter in the conduit system, or in a conduit piece of the switching valve in case the switching valve comprises such a piece for connecting the switching valve to the conduit system.

In an advantageous embodiment, the switching valve of the beverage making device according to the invention comprises a fluid seal that is arranged and configured to prevent fluid flow from the internal switching space to the position setting device. In such an embodiment, it can be ensured that an internal side of the functional portion of the position setting device of the valve is not reached by fluid from inside of the valve, which may otherwise result in exertion of pressure on the functional portion of the position setting device from inside of the valve. In practical designs of the switching valve, such exertion of pressure may cause the functional portion of the position setting device to (almost) immediately switch back to the default position as soon as pressure acting on an external side thereof drops. Hence, in the context of a beverage making device comprising a coffee brewing unit and a milk frothing unit, it may be so that as long as the pumping unit of the device is operated to realize the coffee brewing functionality of the device, the functional portion of the position setting device remains in an associated displaced position, and that as soon as the pumping unit is switched off, the functional portion of the position setting device returns to the default position. This may involve injecting water or even coffee into the milk frothing unit, which should be avoided. One conventional way of addressing this problem would be equipping the beverage making device with additional check valves. However, a cheaper solution resides in realizing a fluid seal in the switching valve between the internal switching space and the position setting device, which furthermore provides a possibility of ensuring that the internal side of the functional portion of the position setting device is subjected to atmospheric pressure under all circumstances.

In a practical embodiment of the beverage making device according to the invention, the pressure-controlled switching valve comprises a carrier shaft that is arranged and configured to carry the switching device and to couple the position setting device to the switching device. In such a configuration, when the functional portion of the position setting device is displaced under the influence of pressure, both the carrier shaft and the switching device are displaced as well. Thus, having a carrier shaft is a practical option of having a coupling between the position setting device and the switching device, and thereby enabling the pressure-controlled switching functionality of the switching valve.

In case a fluid seal is applied in the switching valve between the internal switching space and the position setting device, as explained in the foregoing, the fluid seal may comprise a sealing ring that is arranged and configured to snugly encompass the carrier shaft at a position in the valve body between the internal switching space and the position setting device. Alternatively, it is possible for the carrier shaft to extend through an internal passage between the internal switching space and an adjacent space in the valve body, leaving a portion of the internal passage free so as to allow for fluid flow through the passage, along the carrier shaft.

Assuming that the switching valve is equipped with a carrier shaft as mentioned in the foregoing, it may be practical for the biasing mechanism of the valve to comprise a coil spring that is arranged around the carrier shaft, extending between a fixed base on the valve body and a base on the carrier shaft. In general, any suitable type of spring may be applied, extending between a fixed base on the valve body and a base on the carrier shaft. Having a coil spring that is arranged around the carrier shaft is very practical in view of the fact that a compact and robust configuration is obtained.

As explained in the foregoing, displacement of at least a portion of the position setting device of the switching valve from a default position is an important factor in the functionality of the switching valve. Within the framework of the invention, many possibilities for actually realizing such a displacement exist. For example, it may be so that at least a portion of the position setting device is deformable under the influence of fluid pressure. In view thereof, it may be practical for the position setting device to be at least partially made of a flexible material. The position setting device may comprise a membrane and the combination of the position setting device and the biasing mechanism may be comparable to a membrane valve in that case. Proper operation of the switching valve can be ensured by choosing an appropriate relation between the size of effective surface areas of the membrane and the size of effective surface areas of the functional valve members of the switching device. In any case, it may be most practical for the switching valve to comprise a conduit that is arranged and configured to enable fluid access to the position setting device at the position of a central portion of the membrane.

Within the framework of the invention, the sealing functionality of the functional valve members of the switching device of the switching valve may be realized in any suitable way, wherein it may be practical if both functional valve members are of a similar design, although this is not necessary. For example, it may be so that at least one of the first functional valve member and the second functional valve member of the switching device comprises a sealing ring, and that an internal surface portion of the valve body is arranged and configured to constitute a seat of the sealing ring. Alternatively, it may be so that the valve body is equipped with at least one sealing ring, and that at least one of the first functional valve member and the second functional valve member of the switching device is shaped like a seat for cooperation with the sealing ring. A practical example of the sealing ring is an O-ring, which may be of any suitable type, including a type that is known for being relatively soft and a type comprising two relatively hard parts. Another practical possibility is that at least one of the first functional valve member and the second functional valve member of the switching device comprises a protrusion, and that a passage associated with the respective fluid outlet opening is provided with a sealing ring that is arranged and configured to snugly encompass the protrusion. In such a case, the fluid outlet opening is sealed when the protrusion is in a position in which the sealing ring surrounds a portion of the protrusion, and the seal is broken when the protrusion has retracted from the sealing ring completely. An advantage of having a combination of a protrusion and a sealing ring may be that movement of the protrusion with respect to the sealing ring may be effective in realizing removal of any (scale) deposits from the protrusion and/or the sealing ring, thereby realizing a self-cleaning functionality of the switching valve on the basis of which the switching functionality may be preserved as time passes.

The above-described and other aspects of the invention will be apparent from and elucidated with reference to the following detailed description of a pressure-controlled switching valve and an application of the switching valve in a beverage making device that is designed to make coffee in one operational mode thereof and to froth milk in another operational mode thereof.

BRIEF DESCRIPTION OF THE DRAWINGS

The invention will now be explained in greater detail with reference to the figures, in which equal or similar parts are indicated by the same reference signs, and in which.

DETAILED DESCRIPTION OF EMBODIMENTS

Figure 1:
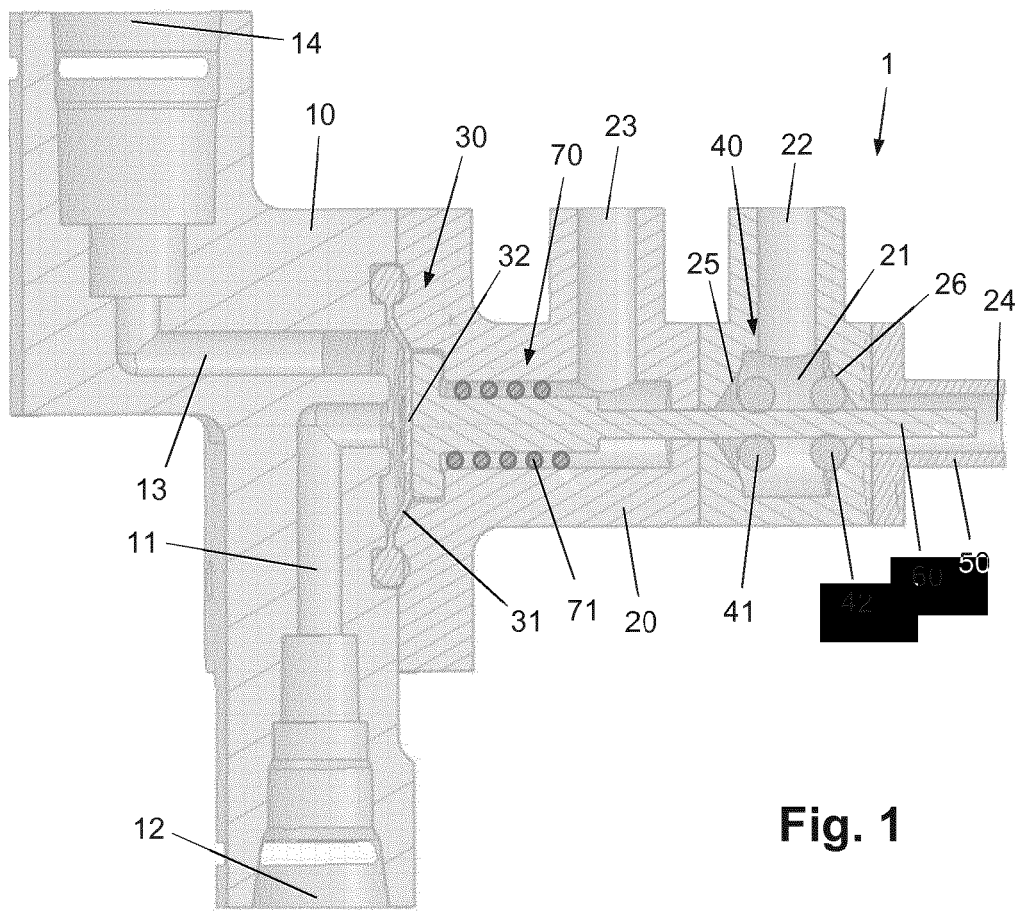
FIG. 1 diagrammatically shows a sectional view of a first embodiment of a switching valve.
Figure 2:
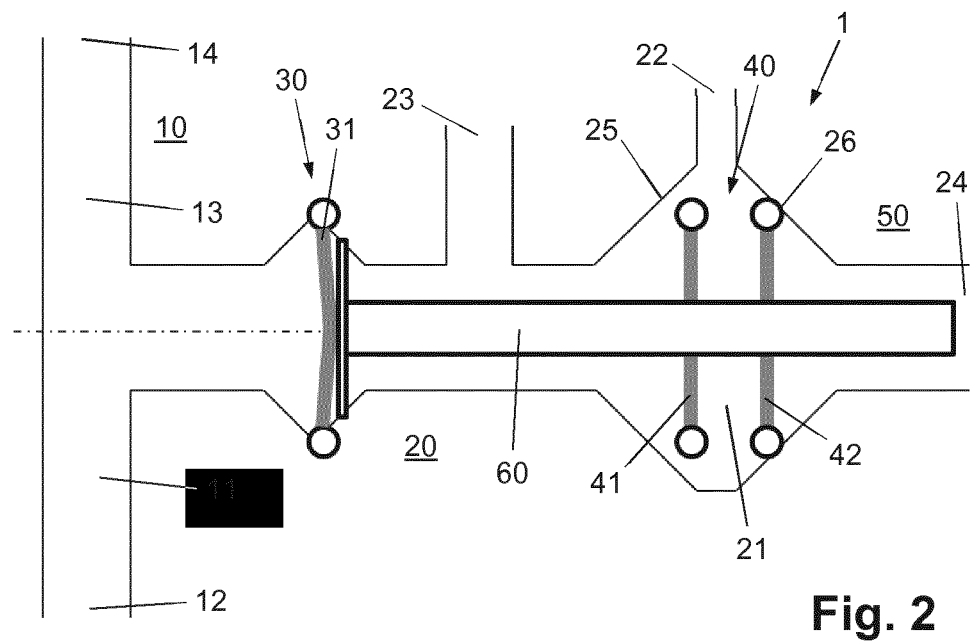
FIGS. 2 and 3 illustrate two different positions of the switching valve.
Figure 3:
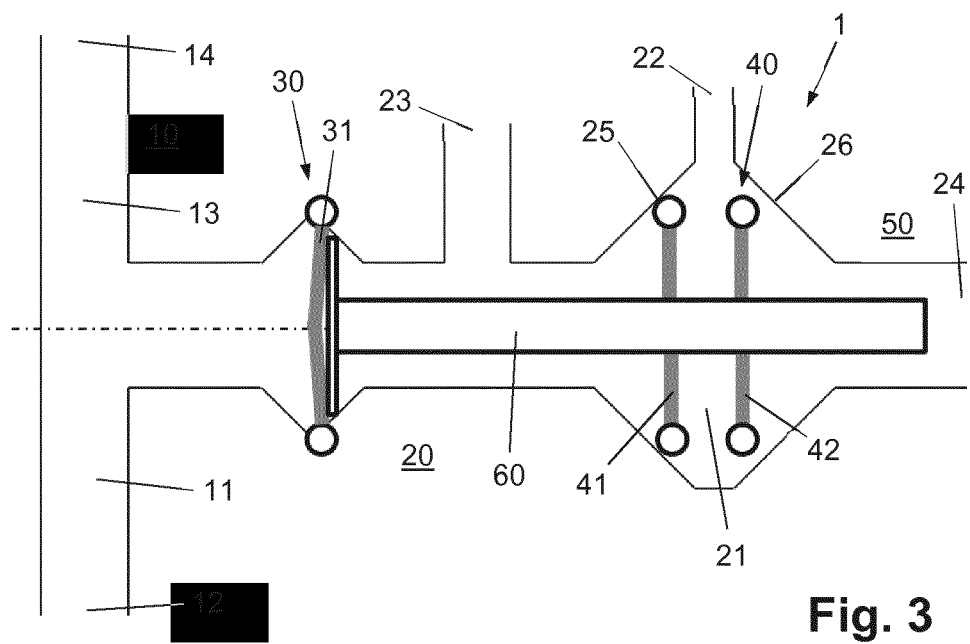

FIGS. 1-3 relate to a first embodiment of a switching valve 1. In general, the switching valve 1 is designed to direct an incoming fluid flow to one of two possible destinations, depending on the position of the switching valve 1. In the shown example, the switching valve 1 has a modular configuration, comprising a conduit piece 10 and a valve body 20. Furthermore, in the shown example, the valve body 20 is composed of three sections, a first section comprising a position setting device 30, a second section comprising a switching device 40 and a third section being an end piece 50 of the valve body 20. The functionalities of the position setting device 30 and the switching device 40 will be explained in the following, wherein it is noted that these functionalities are not related to the modular configuration of the switching valve 1 in any way so that the present description is equally applicable to a non-modular embodiment of the switching valve.

The valve body 20 comprises an internal switching space 21 that is accessible from outside the valve body 20 through a fluid inlet opening 22 in the valve body 20. The switching device 40 is movably arranged in the internal switching space 21 and comprises a first functional valve member 41 and a second functional valve member 42, which are supported on a carrier shaft 60 in an interspaced arrangement, i.e. at different longitudinal positions of the carrier shaft 60. The first functional valve member 41 serves for preventing fluid flow from the internal switching space 21 to a first fluid outlet opening 23 in the valve body 20. Likewise, the second functional valve member 42 serves for preventing fluid flow from the internal switching space 21 to a second fluid outlet opening 24 in the valve body 20. In the shown example, both functional valve members 41, 42 comprise an O-ring.

As mentioned in the foregoing, the switching device 40 is movably arranged in the internal switching space 21. In particular, the carrier shaft 60 is arranged so as to be movable in the longitudinal direction thereof, and in view of the fact that the switching device 40 is supported on the carrier shaft 60, the switching device 40 is movable in the direction as mentioned as well. One possible extreme position of the switching device 40 is illustrated in FIG. 1, and also in the schematic representation of FIG. 2, which is a position in which the second functional valve member 42 contacts a second conical internal surface portion 26 of the valve body 20 and thereby prevents fluid from flowing along the carrier shaft 60 in the direction of the second fluid outlet opening 24. In the representations of FIGS. 1-3, this is a position of the switching device 40 in the internal switching space 21 that is most to the right. In the following, this position will be referred to as second extreme position. Another possible extreme position of the switching device 40 is illustrated in the schematic representation of FIG. 3. This is a position in which the first functional valve member 41 contacts a first conical internal surface portion 25 of the valve body 20 and thereby prevents fluid from flowing along the carrier shaft 60 in the direction of the first fluid outlet opening 23. In the representation of FIGS. 1-3, this is a position of the switching device 40 in the internal switching space 21 that is most to the left. In the following, this position will be referred to as first extreme position.

It follows from the foregoing that in the shown example, the switching functionality of the switching valve 1 is realized by moving the switching device 40 from one extreme position in the internal switching space 21 to another, wherein in each of the extreme positions, a sealing of the respective fluid outlet opening 23, 24 is obtained on the basis of sealing contact of the respective functional valve member 41, 42 to the respective conical internal surface portion 25, 26 of the valve body 20. The dimensioning of the switching device 40, particularly the distance between the two functional valve members 41, 42 is adapted to the dimensioning of the internal switching space 21, so that it is ensured that in each of the extreme positions of the switching device 40, fluid access to one of the fluid outlet openings 23, 24 is blocked while fluid access to the other of the fluid outlet openings 23, 24 is allowed.

The position of the carrier shaft 60 and the switching device 40 arranged on the carrier shaft 60 is set under the influence of fluid pressure. In particular, the position setting device 30 is designed to realize an appropriate relation between fluid pressure and positioning of the carrier shaft 60 and the switching device 40, in combination with a biasing mechanism 70 that is designed to act on the entirety of the position setting device 30, the switching device 40 and the carrier shaft 60. In the shown example, the position setting device 30 comprises a membrane 31 that is arranged at the interface of the conduit piece 10 and the valve body 20. The biasing mechanism 70 may be realized in any suitable fashion. For example, the biasing mechanism 70 may comprise a coil spring 71 that is arranged around the carrier shaft 60, extending between a fixed base on the valve body 20 and a base on the carrier shaft 60. For the sake of clarity, the biasing mechanism 70 is only illustrated in FIG. 1, and not in the schematic representations of FIGS. 2 and 3.

The conduit piece 10 comprises a small conduit system that is intended to be integrated in a larger conduit system of a beverage making device 100 when the switching valve 1 is put in place in the beverage making device 100, as will be explained later with reference to FIG. 4. In particular, in the first embodiment of the switching valve 1 as shown in FIG. 1, the conduit piece 10 comprises a fluid inlet conduit 11 that extends from a fluid entrance opening 12 in the conduit piece 10 up to a position at the interface of the conduit piece 10 and the valve body 20 that corresponds to a central portion 32 of the membrane 31. Furthermore, the conduit piece 10 comprises a fluid outlet conduit 13 that extends from another position at the interface of the conduit piece 10 and the valve body 20 to a fluid discharge opening 14 in the conduit piece 10.

The membrane 31 has flexible properties and it is therefore possible for the membrane 31 to be deformed under the influence of fluid pressure acting on the membrane 31 at the side of the conduit piece 10, which will hereinafter be referred to as external side of the membrane 31. In an unloaded condition, the membrane 31 is in a default position, which is a position that is set under the influence of the biasing mechanism 70 only, and which may be a position in which the membrane 31 is not deformed, although this is not necessary within the framework of the invention. The default position of the membrane 31 is chosen such that in this position, the first extreme position of the switching device 40 is realized, i.e. the extreme position in which the first functional valve member 41 abuts against the first conical internal surface portion 25 of the valve body 20, so that the first fluid outlet opening 23 is sealed.

Starting from a rest condition, when a flow of fluid is initiated in the conduit piece 10, fluid pressure builds up on the central portion 32 of the membrane 31 at the external side thereof. When the fluid pressure gets high enough to counteract the pressure exerted on the membrane 31 by the biasing mechanism 70 in the opposite direction, a displacement of the entirety of the position setting device 30, the switching device 40 and the carrier shaft 60 is realized, until the second functional valve member 42 abuts against the second conical internal surface portion 26 of the valve body 20 and the second extreme position of the switching device 40 is realized. Hence, in that case, the second fluid outlet opening 24 is sealed and fluid that is supplied to the internal switching space 21 through the fluid inlet opening 22 is only allowed to flow from the internal switching space 21 in the direction of the first fluid outlet opening 23. On the other hand, when the fluid pressure does not get high enough to counteract the pressure exerted on the membrane 31 by the biasing mechanism 70 in the opposite direction, the default position of the membrane 31 is maintained. Hence, in such a case, the first fluid outlet opening 23 is sealed and fluid that is supplied to the internal switching space 21 through the fluid inlet opening 22 is only allowed to flow from the internal switching space 21 in the direction of the second fluid outlet opening 24.

It follows from the foregoing that different sealing positions of the switching device 40 can be obtained on the basis of pressure differences of different situations of fluid flowing through the conduit piece 10, along the membrane 31 of the position setting device 30. Provided that in one situation, fluid is supplied at a pressure that is not high enough to counteract the opposite pressure exerted by the biasing mechanism 70, and that in another situation, fluid is supplied at a pressure that is high enough to counteract the opposite pressure exerted by the biasing mechanism 70 and to cause displacement of the entirety of the position setting device 30, the switching device 40 and the carrier shaft 60 from the first extreme position of the switching device 40 to the second extreme position, differentiation is made between those two situations and the fluid can be directed out of the valve body 20 through the fluid outlet opening 23, 24 that is appropriate in a given situation. In that way, automatic switching of the switching valve 1 is obtained in a reliable manner, without a need for any other mechanism than the constructional mechanisms described in the foregoing.

Figure 4:
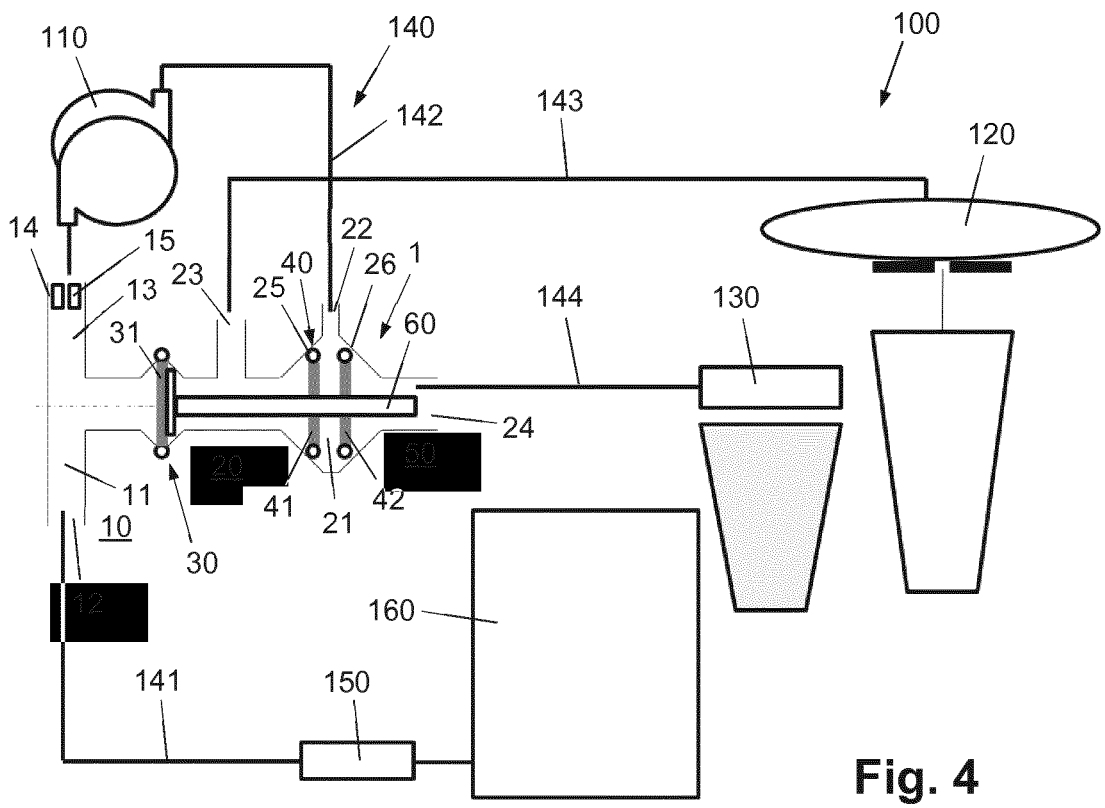
FIG. 4 diagrammatically shows components of a beverage making device that is equipped with a switching valve.

FIG. 4 serves to illustrate an application of the switching valve 1 in a beverage making device 100, particularly a beverage making device 100 that is designed to make coffee in one operational mode thereof and to froth milk in another operational mode thereof, and that has a single heating unit 110 for making hot water or steam, depending on an actual operational mode setting. On the basis of the fact that different fluid pressures are involved in the different operational modes, the switching valve 1 is suitable for realizing a switching functionality in the beverage making device 100 as desired, such that hot water is only allowed to flow towards the right destination in the one operational mode, which destination is a coffee brewing unit 120, and that steam is only allowed to flow towards the right destination in the other operational mode, which destination is a milk frothing unit 130. It is not intended to provide a complete and extensive description of the beverage making device 100. Instead, only those aspects of the beverage making device 100 that are relevant in the context of the invention are addressed. FIG. 4 only provides schematic representations of the various components of the beverage making device 100, including the switching valve 1, wherein it is particularly noted that the biasing mechanism 70 of the switching valve 1 is not illustrated in FIG. 4.

The switching valve 1 is arranged in the coffee making device 100 so as to receive fluid, i.e. hot water or steam, from the heating unit 110 through the fluid inlet opening 22. In general, fluid pressure associated with a coffee brewing mode of the beverage making device 100 is higher than fluid pressure associated with a milk frothing mode of the beverage making device 100. In view thereof, the switching valve 1 is arranged in the beverage making device 100 in such a way that the first fluid outlet opening 23 is connected to the coffee brewing unit 120 and the second fluid outlet opening 24 is connected to the milk frothing unit 130. When the fluid pressure is relatively low, the default position of the membrane 31 of the position setting device 30 of the switching valve 1 is maintained. As explained in the foregoing, this position corresponds to the first extreme position of the switching device 40 of the switching valve 1, i.e. the position in which the first fluid outlet opening 23 is sealed and fluid can only be discharged from the switching valve 1 through the second fluid outlet opening 24. Therefore, the fluid outlet opening 24 that is associated with the milk frothing unit 130 is opened when the beverage making device 100 is operated to make steam, whereas the other fluid outlet opening 23 is closed. When the fluid pressure is relatively high, a displacement of the entirety of the position setting device 30, the switching device 40 and the carrier shaft 60 is obtained under the influence of the pressure acting on the membrane 31 and the membrane 31 deforming as a result thereof. In the process, the second extreme position of the switching device 40 is set, i.e. the position in which the second fluid outlet opening 24 is sealed and fluid can only be discharged from the switching valve 1 through the first fluid outlet opening 23. Therefore, the fluid outlet opening 23 that is associated with the coffee brewing unit 120 is opened when the beverage making device 100 is operated to make hot water, whereas the other fluid outlet opening 24 is closed.

In the beverage making device 100, the small conduit system of the conduit piece 10 of the switching valve 1 is integrated in a larger conduit system 140 of the beverage making device 100, that serves for enabling fluid transport through the beverage making device 100. For the purpose of pressurizing fluid so that an actual flow can be obtained, the beverage making device 100 is equipped with a pumping unit 150. The beverage making device 100 may further comprise a water reservoir 160 as illustrated in FIG. 4, but that does not alter the fact that water may be derived from any suitable source during operation of the beverage making device 100.

The conduit system 140 of the beverage making device 100 comprises a pumping conduit 141 connecting the pumping unit 150 to the heating unit 110, a valve conduit 142 connecting the heating unit 110 to the fluid inlet opening 22 of the valve body 20, a first conduit 143 connecting the first fluid outlet opening 23 of the valve body 20 to the coffee brewing unit 120, and a second conduit 144 connecting the second fluid outlet opening 24 of the valve body 20 to the milk frothing unit 130. The valve switch 1 is arranged in the beverage making device 100 in such a way that the membrane 31 of the position setting device 30 is under the influence of fluid flowing from the pumping unit 150 to the heating unit 110 during operation of the beverage making device 100. In particular, in the shown example, the small conduit system of the conduit piece 10 of the switching valve 1 is integrated in the pumping conduit 141, so that the external side of the membrane 31, i.e. the side of the membrane 31 that is intended to be addressed by external pressure, is exposed to a fluid flow through the pumping conduit 141.

When it is intended to make steam for the purpose of frothing milk, water is supplied to the heating unit 110 at a lower rate than when it is intended to make hot water for the purpose of brewing coffee, so that the water can reside longer in the heating unit 110 and is subjected to heat long enough to evaporate. In a practical example, the flow rate associated with steam generation is in a range of 0.5 to 1 ml/s, whereas the flow rate associated with only heating water is in a range of 4 to 7 ml/s. In practical cases, in order to realize proper functioning of the switching valve 1, it may be advantageous to take measures to ensure a clear differentiation between the fluid pressures associated with the water flows at the different rates. This can be realized by applying a flow restrictor 15 at an appropriate position, which may be a position in the conduit piece 10 of the switching valve 1 as illustrated in FIG. 4, or a position in the larger conduit system 140 of the beverage making device 100. The flow restrictor 15 acts to locally decrease an internal conduit diameter and to thereby multiply the pressure difference between the water flows at the different rates, as it were. In a practical situation, the flow restrictor 15 may comprise an orifice having a diameter in a range of 0.8 to 1.2 mm, for example.

Figure 5:
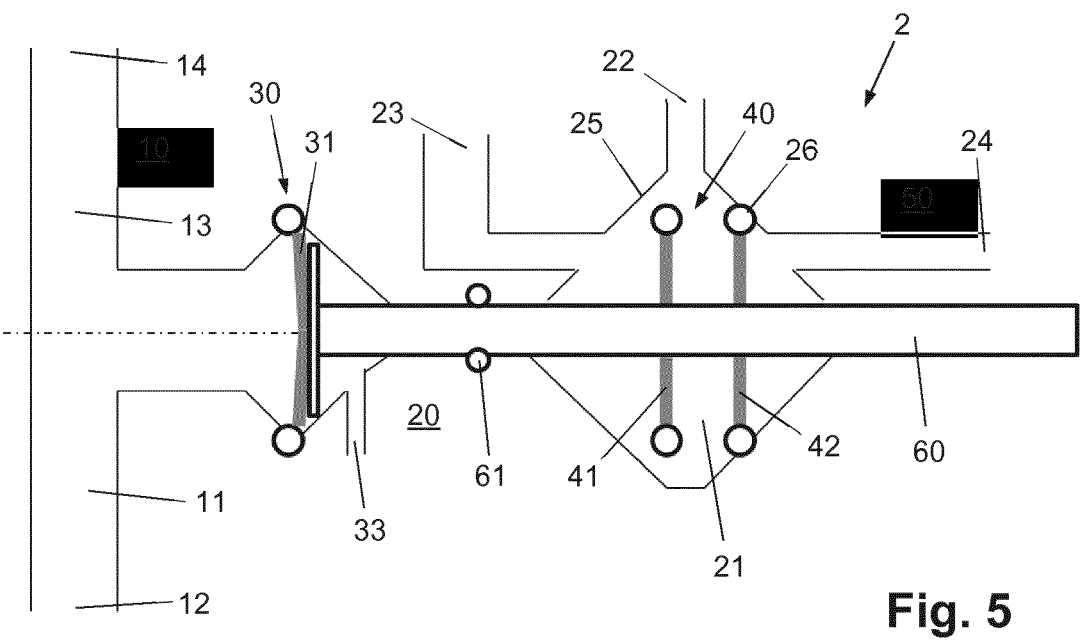
FIG. 5 illustrates an alternative embodiment of a switching valve.

FIG. 5 illustrates an alternative embodiment of a switching valve 2. In the first embodiment of a switching valve 1 as described in the foregoing, all internal parts of the valve body 20 are open to contact with fluid, except for those parts that are intentionally sealed from fluid in one of the extreme positions of the switching device 40. This may not always be desirable, for example, in view of a desire to preserve parts from the influence of water on the material of which those parts are made and/or a desire to avoid a situation in which the membrane 31 is subjected to fluid pressure from inside of the valve body 20, i.e. at an internal side thereof, besides the pressure exerted by the biasing mechanism 70. In view thereof, it may be practical to provide a switching valve 2 in which the carrier shaft 60 is guided through a fluid seal 61 such as an O-ring, as diagrammatically shown in FIG. 5, wherein the fluid seal 61 prevents fluid as supplied to the internal switching space 21 through the fluid inlet opening 22 in the valve body 20 from reaching the position setting device 30. Furthermore, in the shown example, the valve body 20 is provided with an air inlet 33 to enable communication between the internal side of the membrane 31 and ambient air, so as to ensure that atmospheric pressure is always prevailing at the internal side of the membrane 31.

An additional advantage of having the fluid seal 61 as mentioned is that the general diameter of the switching device 40 does not need to be similar to or larger than the diameter of the membrane 31 of the position setting device 30, which would otherwise be advantageous in order to avoid a situation in which the switching device 40 would move back from the second extreme position to the first extreme position the very moment the pumping unit 150 is switched off after having been operated to pump water in the coffee brewing mode of the beverage making device 100, and in which there is a risk that water or even coffee is injected into the milk frothing unit 130 as a result thereof. Apart from the presence of the fluid seal 61, the configuration of the alternative embodiment of the switching valve 2 may be comparable to the configuration of the first embodiment of the switching valve 1. For the sake of completeness, it is noted in this respect that the biasing mechanism 70 is not illustrated in FIG. 5, but that this does not mean that such a mechanism is absent in the alternative embodiment of the switching valve 2.

Figure 6:
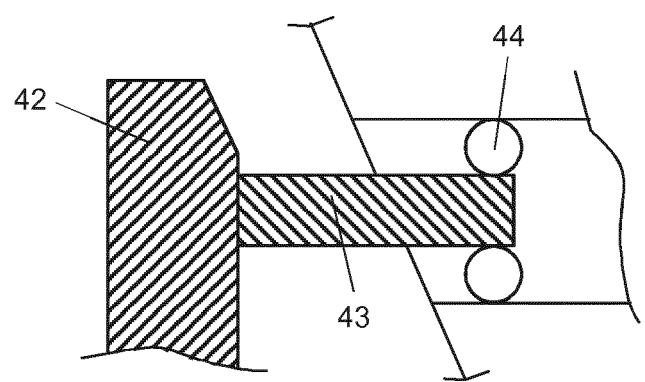
FIG. 6 illustrates an alternative design of a combination of a functional valve member and a fluid outlet passage of a valve body of the switching valve.

In the design as shown in FIGS. 1-5, the switching device 40 comprises two ring-shaped functional valve members 41, 42, wherein each of those valve members 41, 42 is intended to cooperate with a conical internal surface portion 25, 26 of the valve body 20 for realizing a sealing functionality. It is however to be noted that alternative designs of the switching device 40 are possible within the framework of the invention. In that respect, FIG. 6 illustrates a possibility of having a combination of a protrusion and a sealing ring that is arranged and configured to snugly encompass the protrusion. In particular, FIG. 6 shows a portion of the second functional valve member 42 and a protrusion formed as a pin 43 that extends from the valve member 42. The pin 43 can be moved in and out of a sealing ring formed as an O-ring 44 that is arranged at an entrance of the passage leading to the second outlet opening 24. The configuration of the pin 43 and the O-ring 44 as shown in FIG. 6 is associated with the second extreme position of the switching device 40 and serves to seal the second outlet opening 24. When the switching device 40 is displaced to the first extreme position, the pin 43 is retracted from the O-ring 44, so that free access from the internal switching space 21 to the second outlet opening 24 is realized in that position. An advantage of the use of a combination of a protrusion 43 and a sealing ring 44 is that a self-cleaning effect is involved because every time the protrusion 43 is moved with respect to the sealing ring 44, any (scale) deposits that may be present on the protrusion 43 and/or the sealing ring 44 can be scraped off. For the sake of completeness, it is noted that the combination of the protrusion 43 and the sealing ring 44 as shown in FIG. 6 at the side of the second functional valve member 42 may be similarly provided at the side of the first functional valve member 41.

In the foregoing, a membrane 31 is mentioned as an example of a component that is suitable for use in the position setting device 30. In general, any component or combination of components may be used in the switching valve 1, 2 of the beverage making device 100 according to the invention, provided that it is possible to have an arrangement for causing a displacement of the switching device 40 under the influence of fluid pressure, and for realizing a situation in which the switching device 40 is kept in a first extreme position as long as the pressure is below a certain threshold and is put to a second extreme position when the pressure gets higher than the threshold, in combination with the biasing mechanism 70 that influences the value of the threshold and ensures a reset of the switching device 40 to the first extreme position in an unloaded situation. The biasing mechanism 70 may comprise an actual component such as the coil spring 71 as mentioned in the foregoing, or a combination of components, that is added to the construction comprising the position setting device 30 and the switching device 40, but may also be intrinsic in such a construction, for example, on the basis of resilient properties of one or more components of the construction. The position setting device 30 and the switching device 40 may be coupled to each other in any suitable way, the carrier shaft 60 as shown representing a very practical option.

Within the framework of the invention, the beverage making device 100 can be of any type and may include numerous other components in addition to the components as shown and described in the present context, such as one or more valves other than the switching valve 1, 2. In general, the switching valve 1, 2 is suitable to be used in any context in which it is required to direct fluid in one of at least two possible directions depending on an operational mode of a beverage making device, wherein various operational modes involve different fluid pressure profiles.

It will be clear to a person skilled in the art that the scope of the invention is not limited to the examples discussed in the foregoing, but that several amendments and modifications thereof are possible without deviating from the scope of the invention as defined in the attached claims. It is intended that the invention be construed as including all such amendments and modifications insofar they come within the scope of the claims or the equivalents thereof. While the invention has been illustrated and described in detail in the figures and the description, such illustration and description are to be considered illustrative or exemplary only, and not restrictive. The invention is not limited to the disclosed embodiments. The drawings are schematic, wherein details that are not required for understanding the invention may have been omitted, and not necessarily to scale.

Variations to the disclosed embodiments can be understood and effected by a person skilled in the art in practicing the claimed invention, from a study of the figures, the description and the attached claims. In the claims, the word "comprising" does not exclude other steps or elements, and the indefinite article "a" or "an" does not exclude a plurality.

Any reference signs in the claims should not be construed as limiting the scope of the invention.

Elements and aspects discussed for or in relation with a particular embodiment may be suitably combined with elements and aspects of other embodiments, unless explicitly stated otherwise. Thus, the mere fact that certain measures are recited in mutually different dependent claims does not indicate that a combination of these measures cannot be used to advantage.

The term "comprise" as used in this text will be understood by a person skilled in the art as covering the term "consist of". Hence, the term "comprise" may in respect of an embodiment mean "consist of", but may in another embodiment mean "contain/include at least the defined species and optionally one or more other species".

In short, the invention provides a beverage making device 100 comprising a pressure-controlled switching valve 1, 2 that comprises the following components: a valve body 20 comprising an internal switching space 21; a switching device 40 being movably arranged in the internal switching space 21 and comprising two functional valve members 41, 42 that are arranged and configured to seal respective fluid outlet openings 23, 24 of the valve body 20 in respective positions of the switching device 40; a position setting device 30 for displacing the switching device 40 under the influence of fluid pressure acting on the position setting device 30 at one side thereof; and a biasing mechanism 70 acting on the entirety of the switching device 40 and the position setting device 30 coupled thereto. The beverage making device 100 further comprises a conduit system 140 that is arranged and configured to enable fluid transport through the beverage making device 100, and one side of at least a functional portion 31 of the position setting device 30 of the switching valve 1, 2 is open to the conduit system 140.

The invention claimed is:

1. A beverage making device that is designed to make a hot beverage by allowing for interaction between a beverage basic material and a hot extracting liquid in one operational mode thereof, and to froth a liquid by supplying a frothing gas to a liquid in another operational mode thereof, comprising:

a brewing unit that is arranged and configured to accommodate a quantity of the beverage basic material and to receive a quantity of hot extracting liquid;

a frothing unit that is arranged and configured to accommodate a quantity of liquid to be frothed and to receive a quantity of hot frothing gas;

a heating unit that is arranged and configured to heat a quantity of input liquid for the purpose of obtaining the quantity of hot extracting liquid and the quantity of hot frothing gas;

a pumping unit that is arranged and configured to pump the input liquid to the heating unit, and that is operable to realize one of at least two different flow rates of the input liquid;

a pressure-controlled switching valve that is arranged downstream of the heating unit, that is coupled to the heating unit, the brewing unit, and the frothing unit, and that comprises a valve body, a switching device, a position setting device and a biasing mechanism, the valve body comprising an internal switching space that is accessible from outside the valve body through at least one fluid inlet opening in the valve body, and that is associated with two fluid outlet openings in the valve body, the switching device being movably arranged in the internal switching space and comprising a first functional valve member that is arranged and configured to seal a first fluid outlet opening in a first position of the switching device, and a second functional valve member that is arranged and configured to seal a second fluid outlet opening in a second position of the switching device, the position setting device being arranged in the valve body and being coupled to the switching device, at least a functional portion of the position setting device being arranged and configured to be displaceable from a default position under the influence of fluid pressure acting on the position setting device at one side thereof, and the biasing mechanism being arranged and configured to bias the entirety of the switching device and the position setting device coupled thereto towards a position corresponding to the default position of the functional portion of the position setting device; and a conduit system that is arranged and configured to enable fluid transport through the beverage making device, and that comprises a pumping conduit connecting the pumping unit to the heating unit, a valve conduit connecting the heating unit to the fluid inlet opening of the valve body of the switching valve, and furthermore a first conduit connecting the first fluid outlet opening of the valve body of the switching valve to the brewing unit, and a second conduit connecting the second fluid outlet opening of the valve body of the switching valve to the frothing unit, respectively, wherein one side of at least a functional portion of the position setting device of the switching valve is open to the conduit system, wherein the functioning of the switching valve is based at least in part on the realized one of the at least two different flow rates of the input liquid, wherein the realized flow rate is one of a first flow rate used to froth milk and a second flow rate used to brew coffee.

2. The beverage making device of claim 1, wherein one side of at least a functional portion of the position setting device of the switching valve is open to the pumping conduit.

3. The beverage making device of claim 1, comprising a flow restrictor that is arranged and configured to locally decrease an internal diameter in the conduit system.

4. The beverage making device of claim 1, wherein the switching valve comprises a conduit piece that is arranged and configured to connect the switching valve to the conduit system, and wherein the switching valve comprises a flow restrictor that is arranged and configured to locally decrease an internal diameter in the conduit piece.

5. The beverage making device of claim 1, wherein the switching valve comprises a fluid seal that is arranged and configured to prevent fluid flow from the internal switching space to the position setting device.

6. The beverage making device of claim 1, wherein the switching valve comprises a carrier shaft that is arranged and configured to carry the switching device and to couple the position setting device to the switching device.

7. The beverage making device of claim 6, wherein, in the switching valve, the carrier shaft extends through an internal passage between the internal switching space and an adjacent space in the valve body, leaving a portion of the internal passage free so as to allow for fluid flow through the passage, along the carrier shaft.

8. The beverage making device of claim 6, wherein, in the switching valve, a fluid seal comprises a sealing ring that is arranged and configured to encompass the carrier shaft at a position in the valve body between the internal switching space and the position setting device.

9. The beverage making device of claim 6, wherein, in the switching valve, the biasing mechanism comprises a coil spring that is arranged around the carrier shaft, extending between a fixed base on the valve body and a base on the carrier shaft.

10. The beverage making device of claim 1, wherein, in the switching valve, at least a portion of the position setting device is deformable under the influence of fluid pressure.

11. The beverage making device of claim 1, wherein, in the switching valve, the position setting device comprises a membrane.

12. The beverage making device of claim 11, wherein the switching valve comprises a conduit that is arranged and configured to enable fluid access to the position setting device at the position of a central portion of the membrane.

13. The beverage making device of claim 1, wherein, in the switching valve, at least one of the first functional valve member and the second functional valve member of the switching device comprises a sealing ring, and wherein an internal surface portion of the valve body is arranged and configured to constitute a seat of the sealing ring.

14. The beverage making device of claim 1, wherein, in the switching valve, at least one of the first functional valve member and the second functional valve member of the switching device comprises a protrusion, and wherein a passage associated with the respective fluid outlet opening is provided with a sealing ring that is arranged and configured to encompass the protrusion.

15. The beverage making device of claim 1, wherein a distance between the first functional valve member and the second functional valve member is a function of dimensioning of the internal switching space to ensure that fluid access to one of the first fluid outlet opening and the second fluid outlet opening is blocked while fluid access to the other of the first fluid outlet opening and the second fluid outlet opening is allowed.

16. The beverage making device of claim 3, wherein the flow restrictor comprises an orifice having a diameter in a range of 0.8 to 1.2 mm.

17. The beverage making device of claim 1, wherein the functioning of the switching valve is based at least in part on a pressure difference between a first pressure associated with the first flow rate and a second pressure associated with the second flow rate.

* * * * *